United States Patent
Krause

[11] 3,855,604
[45] Dec. 17, 1974

[54] AUTOMATIC EXPOSURE APPARATUS FOR CAMERAS

[76] Inventor: Gerhard Krause, Ringstrasse 26, 8019 Ebersberg, Germany

[22] Filed: July 27, 1973

[21] Appl. No.: 383,390

[30] Foreign Application Priority Data
Aug. 4, 1972 Germany.......................... 2238522

[52] U.S. Cl. ................................................. 354/60
[51] Int. Cl............................ G01j 1/44, G03b 7/08
[58] Field of Search......... 95/10 CT; 354/51, 59, 60

[56] References Cited
UNITED STATES PATENTS
3,679,905  7/1972  Watanabe..................... 95/10 CT X Primary Examiner—Joseph F. Peters, Jr.
Attorney, Agent, or Firm—Hill, Gross, Simpson, Van Santen, Steadman, Chiara & Simpson

[57] ABSTRACT

An automatic exposure apparatus for a camera comprises an opto/electronic light transducer coupled to an amplifier which drives a meter and/or shutter mechanism. A changeable feedback coupling is provided for the amplifier including a storage device which stores a feedback signal representative of the exposure condition which existed prior to the exposure. The amplifier is controlled during exposure by the stored feedback signal and by a signal which is emitted from the light receiver.

6 Claims, 4 Drawing Figures

AUTOMATIC EXPOSURE APPARATUS FOR CAMERAS

BACKGROUND OF THE INVENTION

1. Field of the Invention

This invention relates to exposure measuring devices and is more particularly concerned with automatic exposure devices which comprise an opto/electronic light transducer for use in cameras.

2. Description of the Prior Art

It is desirable in high quality cameras to completely automatically control the exposure in response to illumination intensities which are on the order of magnitude of $10^{-2}$ lux. Corresponding requirements also apply for highly sensitive light meters.

In automatic exposure measuring devices heretofore known, photo resistors have been employed as light detectors. In the case of very low illumination intensities, however, the large time constant of the photo resistors is disturbing. After shorter, but more intense illumination, it requires minutes of waiting until a measurement for lesser intensities of illumination can be performed. In addition, many photo resistors also possess a disturbing and pronounced nonlinearity. For the reasons mentioned above, photo resistors for detecting illumination intensity in the order of magnitude of $10^{-2}$ lux are no longer suitable. Also, silicon photo diodes are not suitable for this purpose during the blockage voltage operation in the case of such small illumination intensities. When the highest environmental temperatures normally encountered are to be considered, the dark current of such devices amounts to approximately a hundred times the photo current. A compensation of the dark current under these circumstances has not proven successful.

The dark current can be eliminated if the photo diode is operated as a photo element. With this technique, however, success can only be partially achieved since, in reality, also thermally created load carrier pairs prove disturbing. Since the current flow of the photo diode which is operated as a photo element is very strongly temperature dependent, it cannot be considered by means of a non-current calibration. It is therefore required that the current flow be much less than the photo current. With an illumination intensity of $10^{-2}$ lux and an effective diode surface of 1 mm$^2$ the photo current amounts to approximately 5 picoamperes (pA). The insertion of an optical filter in front of the photo diode which adapts the spectral sensitivity of the receiver to the spectral brightness sensitivity of the eye has already been taken into consideration. This means that in case of the highest occurring temperature of, for example 50°C. the diode current flow must be less than 1 pA. In normal diodes this requirement can only be fulfilled if the voltage at the diode remains less than approximately 10 $\mu$Volts. Such small signal potentials, however, are absorbed in the temperature drift of the following amplifier whereby the same must be taken into consideration because of the very small photo current and field effect transistors have to be used as an initial stage. An enlargement of the diode surface does not offer advantages with respect to the detection limit, since also the undesired diode current increases at the same ratio as the photo current when the surface is increased.

Even if specially developed photo diodes are used which make available a signal voltage in the order of magnitude of 0.5 mV, such a voltage is still too small for a direct current amplification. It should be observed that the operational temperature should lie in a range of, for example, $-30°$ to $+50°C$, and that at the input of the subsequently connected amplifier, field effect transistors have to be employed. Special selections of the field effect transistors with respect to very small temperature drift cannot be carried out due to the excessively high expense involved in providing such structure for cameras. It is a further disadvantage of the direct voltage amplifications that a zero point adjustment of the amplifier is required.

SUMMARY OF THE INVENTION

The present invention is based on the task of finding a new automatic exposure apparatus, particularly for use in cameras, wherein the previously mentioned drawbacks do not occur.

According to the invention, the foregoing task is achieved through the provision of an automatic exposure device of the initially-mentioned type wherein an amplifier is provided with a changeable feedback coupling and is coupled to the light receiver. The feedback coupling of the amplifier can be changed in such a way that its value is small at the time when an exposure is initiated with respect to the value prior to the beginning of the exposure. The feedback path includes a memory which stores the feedback signal which occurs prior to the exposure during the exposure and the amplifier is controlled during exposure by the stored signal and by the signal emitted from the light receiver.

BRIEF DESCRIPTION OF THE DRAWINGS

Other objects, features and advantages of the invention, its organization, construction and operation will be best understood from the following detailed description of certain embodiments of the invention, taken in conjunction with the accompanying drawing, on which.

DESCRIPTION OF THE PREFERRED EMBODIMENTS

Figure 1:
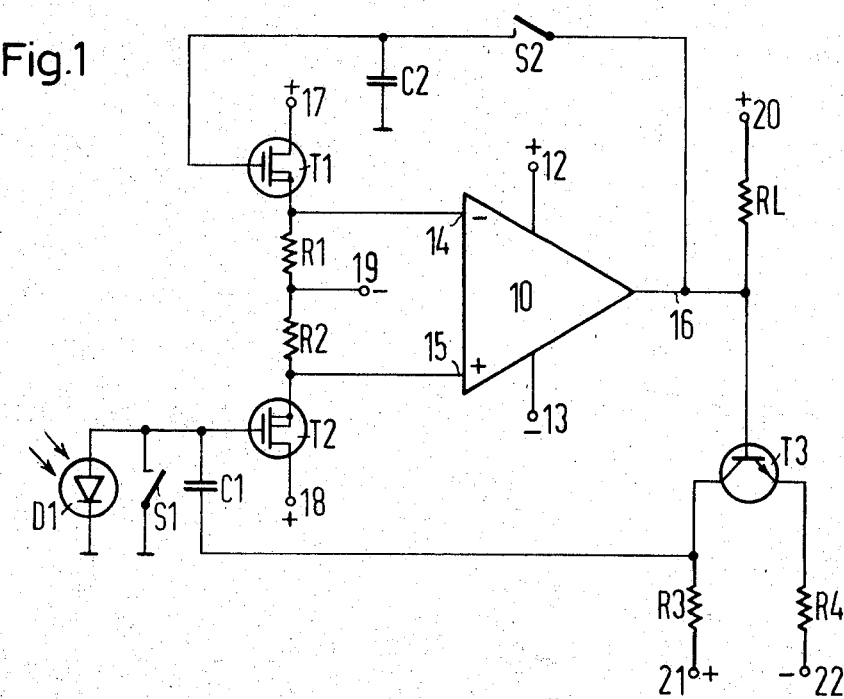
FIG. 1 is a schematic illustration of an embodiment of a circuit for an automatic exposure device constructed in accordance with the principles of the present invention.

Referring to FIG. 1, automatic exposure apparatus is schematically illustrated as comprising a photo diode D1 which is employed as an opto/electronic light transducer. A switch S1 is connected in parallel with the photo diode D1 and is closed prior to the initiation of an exposure. The photo diode D1 operates into a field effect transistor T2. The output of the field effect transistor T2 is connected to the non-inverting input 15 of an operational amplifier 10. Another field effect transistor T1 is connected to the inverting input 14 of the operational amplifier 10.

The operational amplifier 10 includes an output 16 which is connected to the positive pole of an electrical supply by way of a load resistor RL. The output 16 is further connected back to the inverting input 14 by way of a feedback circuit which includes a switch S2 and the field effect transistor T1. In the feedback direction, a storage capacitor C2 is connected to the switch S2. The switch S2 is closed before the beginning of an exposure.

The output 16 of the operational amplifier 10 is further connected back to the non-inverting input 15 by way of the bipolar transistor T3, a capacitor C1 and the field effect transistor T2.

The operational voltage of the operational amplifier 10, the field effect transistors T1 and T2, as well as the bipolar transistor T3, is received at the terminals 12, 13, 17, 18, 19 and 20, and at the terminals 21 and 22 by way of respective resistors R3 and R4, all with the polarities illustrated on the drawing.

In the above described circuit arrangement, light falls continuously on the photo diode D1. Before opening of the shutter of the camera, the switches S1 and S2 are closed. The photo current of the photo diode D1 is short circuited in this case, also by way of the switch S1. The field effect transistors T1 and T2 work together with the resistors R1 and R2 as a source follower circuit. The control current of the field effect transistor T2 has to be substantially smaller than 1 pA since the circuit cannot differentiate between photo current and control current applied to the control electrode.

In the case of a closed switch S2 the output 16 of the operational amplifier 10 is connected via the field effect transistor T1 with the inverting input 14. The transmission factor of the feedback circuit so formed is approximately equal to 1. The voltage transmission factor from the control electrode of each field effect transistor to the output of the operational amplifier is therefore also equal to 1. This means that the drift voltage and the offset voltage of the two field effect transistors T1 and T2 and of the operational amplifier 10 reach the output 16 without amplification. The errors resulting therefrom are therefore negligible.

At the beginning of an exposure the switch S1 is opened. It is decisive that simultaneously the switch S2 is also opened. Therefore, the strong feedback coupling is interrupted during the exposure time. The working point of the field effect transistor T2 should not shift during the opening of the switch S2. Therefore, the capacitor C2 stores the voltage which existed at the control electrode of the field effect transistor T1 immediately prior to opening of the switch S2.

The photo current of the diode D1 charges the integration capacitor C1. The voltage at this capacitor increases in a timelinear manner. The bipolar transistor T3 serves, together with the resistors R4 and R5, at this point only as a phase reversing stage for the output signal of the operational amplifier 10. This signal which is amplified and reversed with respect to the phase thereof was at the point of the capacitor C1 which is connected to the collector of the transistor T3. For this purpose, the capacitance value is apparently increased by the loop amplification—approximately 3,000 times. Therefore, comparatively small values of integration capacitors can be employed. The output voltage of the operational amplifier 10 equals approximately zero at the beginning of the exposure time. It continuously increases during the time of exposure to approximately 1 V. At this value, the base voltage of the transistor T3 almost equals its collector voltage. At this point, the transistor T3 no longer operates as an amplifier. The output signal of the operational amplifier 10 reaches the integration capacitor C1 directly (without phase reversal). The crossed positive recoupling causes the output voltage of the operational amplifier to jump in a few microseconds to the value of the positive operational voltage. The current to the load resistor RL becomes zero. If the load resistor RL is formed by a polar magnet, which effects closing of the shutter during a current zero, the exposure is therewith terminated.

In the case of a more intense illumination, the increased speed of the signal of the operational amplifier 10 is larger. Therefore, the threshold voltage is reached earlier at the output of the operational amplifier 10. Correspondingly, the exposure time is shorter. The automatic exposure device provides that the light which reaches the film is equal in each photographic picture and is independent of the fact of how great the illumination intensity of the object is. The assignment of the illumination intensity to the exposure time can be freely selected by the size of the integration capacitor C1. In a practical dimensioning of the circuit illustrated in FIG. 1 the exposure time amounts to 20 seconds in the case of an illumination intensity of $10^{-2}$ lux. The shorter the desired exposure time at a given illumination, the lower are the requirements with respect to the operational amplifier 10. By increasing the integration capacitor C1, also, essentially longer exposure times than 20 seconds can be realized.

The amplification of the operational amplifier 10 has essentially no influence on the exposure time. The apparent capacitance value of the integration capacitor C1 increases to the same extent as the amplification. The increase speed of the voltage remains, therefore, unchanged at the output of the operational amplifier 10.

It is sufficient to switch on the operating voltage shortly before the opening of the switches S1 and S2. The oscillation time which passes until after application of the voltage with which the exposure reading can be taken is shorter than 1 ms.

The output voltage of the operational amplifier 10 amounts to 1 V shortly before the switching. The amplification is also larger than 3,000 in the case of low ohmic load resistors RL of 300 ohm.

The voltage at the photo diode D1 is therefore smaller than 0.33 mV shortly before the switching operation. The initially mentioned condition that the voltage at the diode not exceed 0.5 mV is therefore fulfilled.

The difference of the source voltage drift of the two field effect transistors T1 and T2 is not permitted to exceed 0.5 mV during the duration of the exposure. This requirement can be easily fulfilled also with discrete field effect transistors without a pairing being required. Almost any MOS field effect transistor can be used for this purpose, provided the control current is much smaller than 1 pA.

The circuit according to FIG. 1 is designed for n-channel field effect transistors. Also, p-channel field effect transistors can be used. In case of low requirements, also blocking layer field effect transistors, or even bipolar transistors, can be used.

Figure 2:
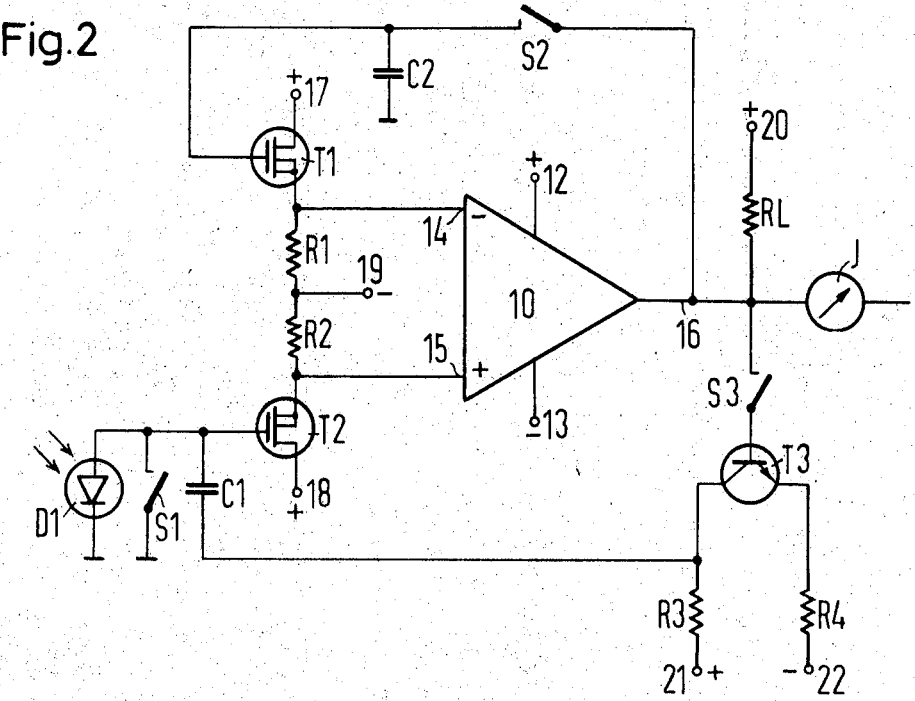
FIG. 2 is a schematic circuit diagram of another embodiment of a circuit arrangement for an exposure device constructed in accordance with the principles of the present invention.
Figure 3:
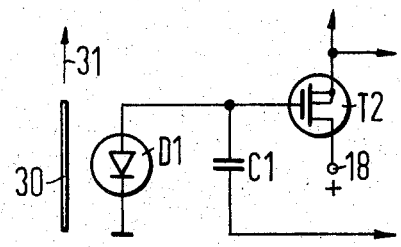

In a further development of the invention shown in FIG. 3 in which the lower left part of the circuitry according to FIGS. 1 or 2 is illustrated, a light filter 30 movable in the direction of an arrow 31 and having a changeable transparency characteristic can be arranged in front of the photo diode D1 in its light path.

It is therefore essential that the transparency of the light filter change at the beginning of the exposure. The signal which is released from the photo diode D1 and which occurs in the case of finite transparency of the light filter before the exposure is largely suppressed as is the case in the drift voltage of the field effect transistors T1 and T2, as well as the operational amplifier 10, by a feedback coupling by way of the switch S2. It is obvious that in this case the switch S1 may be omitted.

Figure 4:
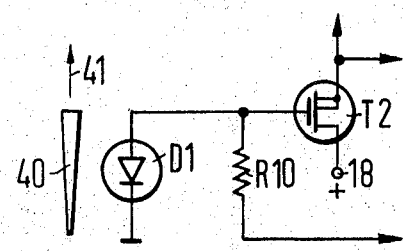

According to another embodiment shown in FIG. 4 in which the lower left part of the circuitry according to FIGS. 1 or 2 is illustrated an absorption filter 40 movable in the direction of an arrow 41 can be arranged in front of the photo diode D1 in the light path thereof, whose transparency continually changes during the exposure time. In this case, the capacitor C1 can be eliminated and the photo diode D1 can operate on a resistor R10. The transparency of the filter at the time at which the signal exceeds a prescribed value is a measure for the illumination intensity. This condition of the absorption filter can be mechanically stored and can be used for an independent adjustment of the exposure time. In this case switch S1 may also be omitted.

In addition, often an exposure meter which is installed into a camera is required apart from an automatic exposure device so that the photographer can select the optimum aperture before releasing the shutter. In FIG. 2, in which the same elements as in FIG. 1 have been provided with the same reference characters, I illustrate an embodiment of the invention wherein these requirements can be fulfilled by a slight change of the circuit illustrated in FIG. 1. In addition to a measuring instrument J which is adjusted in illumination intensity, or equivalent magnitudes, only a further switch S3 is required. This switch is connected between the base of the transistor T3 and the output 16 of the operational amplifier 10. The switch S3 interrupts the feedback path by way of the transistor T3 during an "exposure measuring" mode of operation. Therefore, switching of the entire circuit is avoided when the threshold value is exceeded. Furthermore, the apparent increase of the value of the integration capacitor C1 does not occur. For this reason, in fractions of a second, the no load voltage occurs at the photo diode D1. This no load voltage is in proportion to the logarithm of the illumination capacity. The logarithmic effect is required in this mode of operation so that the entire possible illumination intensity area can be reflected without switching onto the instrument J. The amount of the voltage is substantially larger than in the "automatic" mode of operation. During the "exposure measuring" mode of operation the switch S2 remains closed. It can also be bridged by a further switch (not illustrated). Therefore, the no load voltage of the photo diode D1 is transmitted with the voltage transmission factor 1 to the instrument J. In the "exposure measuring" mode of operation, the accuracy and the indicating limit as in the "automatic" mode of operation is not achieved. This is avoided by the temperature dependency of the no load voltage of the photo diode D1. This accuracy, however, is also not required since an orienting measuring is sufficient for a photographer. During the film exposure in any case, the automatic device accepts this accurate control.

Although I have described my invention by reference to certain embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An automatic exposure apparatus for a camera, comprising: an opto/electric light transducer for producing an exposure signal; an amplifier having first and second inputs, and an output for connection to a controlled device, said transducer connected to said first input, a feedback circuit connected between said output and said second input and having a variable feedback signal whose value preceding the exposure is large compared with its value during the exposure, said feedback circuit comprising storage means for storing a feedback signal representative of the exposure signal preceding said exposure; means operable to make said exposure signal and said feedback signal effective at their respective inputs to said amplifier during an exposure; and a switch closed before an exposure and connected in parallel with said transducer and opened during an exposure.

2. An automatic exposure apparatus for a camera, comprising: an opto/electric light transducer for producing an exposure signal; an amplifier having first and second inputs, and an output for connection to a controlled device, said transducer connected to said first input, a feedback circuit connected between said output and said second input and having a variable feedback signal whose value preceding the exposure is large compared with its value during the exposure, said feedback circuit comprising storage means for storing a feedback signal representative of the exposure signal preceding an exposure; means operable to make said exposure signal and said feedback signal effective at their respective inputs to said amplifier during an exposure; said amplifier being an operational amplifier, wherein said first input is a non-inverting input and said second input is an inverting input, said feedback circuit comprising a normally closed switch operable to disconnect said output from said feedback circuit during an exposure; a first field effect transistor connecting said transducer to said non-inverting input; a second field effect transistor connecting said storage means to said inverting input; a phase reversing stage connecting said output to said non-inverting input via said first field effect transistor; and an integration capacitor connected between said phase reversing stage and said first field effect transistor.

3. Apparatus according to claim 2, wherein said phase reversing stage includes a bipolar transistor having a first electrode connected to said output and a second electrode connected to said capacitor.

4. Apparatus according to claim 3, comprising a measuring instrument connected to said output and another normally closed switch connected in the path between said output and said non-inverting input and opened at the initiation of an exposure.

5. Automatic exposure apparatus for a camera, comprising an opto/electric light transducer including a photo diode responsive to light to produce an exposure signal; an operational amplifier having a non-inverting input, an inverting input, and an output for connection to a controlled device; first and second field effect transistors connected to respective ones of said inputs, said photo diode connected to said first field effect transistor; first and second feedback circuits connected between said output and said field effect transistors, respectively; a first switch normally shunting said photo diode; a storage capacitor in said second feedbck circuit for storing a feedback signal representative of the last exposure; a second normally closed switch connecting said output to said storage capacitor; a phase reversing stage in said first feedback path to reverse the phase of the fed back output signal; and an integration capacitor connected in said first feedback path between said phase reversing stage and said first field effect transistor for integrating the phase reversed feedback signal, said switches operable to effect application of said exposure and feedback signals to said field effect transistors during an exposure.

6. Apparatus according to claim 5, comprising a light meter connected to said output and a third switch for opening said first feedback circuit during an exposure.

* * * * *